(12) United States Patent
Orzechowski et al.

(10) Patent No.: US 11,001,268 B2
(45) Date of Patent: May 11, 2021

(54) ACTIVE VEHICLE CHASSIS DAMPENING SYSTEMS AND METHODS

(71) Applicants: Jeffrey M Orzechowski, Troy, MI (US); Brian D Dwyer, Ortonville, MI (US); Gregory A Sbroglia, Farmington Hills, MI (US); Peter Kalinowsky, White Lake, MI (US); Matthew Kamps, Wyoming, MI (US)

(72) Inventors: Jeffrey M Orzechowski, Troy, MI (US); Brian D Dwyer, Ortonville, MI (US); Gregory A Sbroglia, Farmington Hills, MI (US); Peter Kalinowsky, White Lake, MI (US); Matthew Kamps, Wyoming, MI (US)

(73) Assignee: FCA US LLC, Auburn Hills, MI (US)

( * ) Notice: Subject to any disclaimer, the term of this patent is extended or adjusted under 35 U.S.C. 154(b) by 206 days.

(21) Appl. No.: 15/969,187

(22) Filed: May 2, 2018

(65) Prior Publication Data
US 2019/0337524 A1 Nov. 7, 2019

(51) Int. Cl.
*B60K 31/04* (2006.01)
*B60K 5/00* (2006.01)
*F16F 13/00* (2006.01)
*F16F 13/26* (2006.01)
(Continued)

(52) U.S. Cl.
CPC ........ *B60W 50/0098* (2013.01); *B60W 10/06* (2013.01); *B60W 10/30* (2013.01); *B60W 30/182* (2013.01); *B60W 30/188* (2013.01); *F16F 15/002* (2013.01); *B06B 1/12* (2013.01); *B06B 1/16* (2013.01); *B60W 2420/00* (2013.01); *B62D 21/02* (2013.01); *F02D 41/0087* (2013.01)

(58) Field of Classification Search
None
See application file for complete search history.

(56) References Cited

U.S. PATENT DOCUMENTS 4,600,863 A    7/1986   Chaplin et al.
4,700,972 A * 10/1987   Young .................... B60G 3/265
                                                 280/5.508

(Continued)

FOREIGN PATENT DOCUMENTS

DE           3916032 C2    7/1995
DE       19749134 A1    6/1998
(Continued)

*Primary Examiner* — Adam D Tissot
*Assistant Examiner* — Laura E Linhardt
(74) *Attorney, Agent, or Firm* — Ralph E Smith

(57) ABSTRACT

A system and method for calibrating and controlling an active dampening system for a chassis of a vehicle having an engine involve operating the engine in a cylinder deactivation mode and, during the cylinder deactivation mode, (i) receiving, from a set of sensors, measured vibrations on first and second frame rails of the chassis, (ii) generating control signals for a set of actuators based on the measured vibration of the first and second frame rails, each actuator being configured to generate a vibrational force in at least one direction, and (iii) outputting, to the set of actuators, the control signals, wherein receipt of the control signals cause the set of actuators to generate vibrational forces that dampen the vibration of the first and second frame rails, respectively, to decrease noise/vibration/harshness (NVH).

8 Claims, 12 Drawing Sheets

(51) Int. Cl.
*B60G 17/00* (2006.01)
*B60G 17/017* (2006.01)
*B60W 50/00* (2006.01)
*B60W 10/06* (2006.01)
*B60W 10/30* (2006.01)
*B60W 30/182* (2020.01)
*B60W 30/188* (2012.01)
*F16F 15/00* (2006.01)
B06B 1/12 (2006.01)
B06B 1/16 (2006.01)
B62D 21/02 (2006.01)
F02D 41/00 (2006.01)

(56) References Cited

U.S. PATENT DOCUMENTS

| | | |
|---|---|---|
| 4,794,392 A | 12/1988 | Selinko |
| 4,796,873 A | 1/1989 | Schubert |
| 5,239,789 A | 8/1993 | Uno et al. |
| 6,254,069 B1 | 7/2001 | Muramatsu et al. |
| 6,874,748 B2 | 4/2005 | Hanagan |
| 7,461,728 B2 | 12/2008 | Huston et al. |
| 7,537,202 B2 | 5/2009 | Watanabe |
| 10,464,408 B2 * | 11/2019 | Dudar ................ F02D 41/0087 |
| 2006/0272910 A1 | 12/2006 | Kraner |
| 2009/0126608 A1 | 5/2009 | Borissov et al. |
| 2010/0094511 A1 * | 4/2010 | Krueger ................ B60K 6/48 701/48 |
| 2012/0277917 A1 | 11/2012 | Ryaboy et al. |
| 2016/0096271 A1 | 4/2016 | Taylor et al. |

FOREIGN PATENT DOCUMENTS

| | | |
|---|---|---|
| EP | 1333122 A2 | 8/2003 |
| WO | 2009126608 A2 | 10/2009 |

* cited by examiner

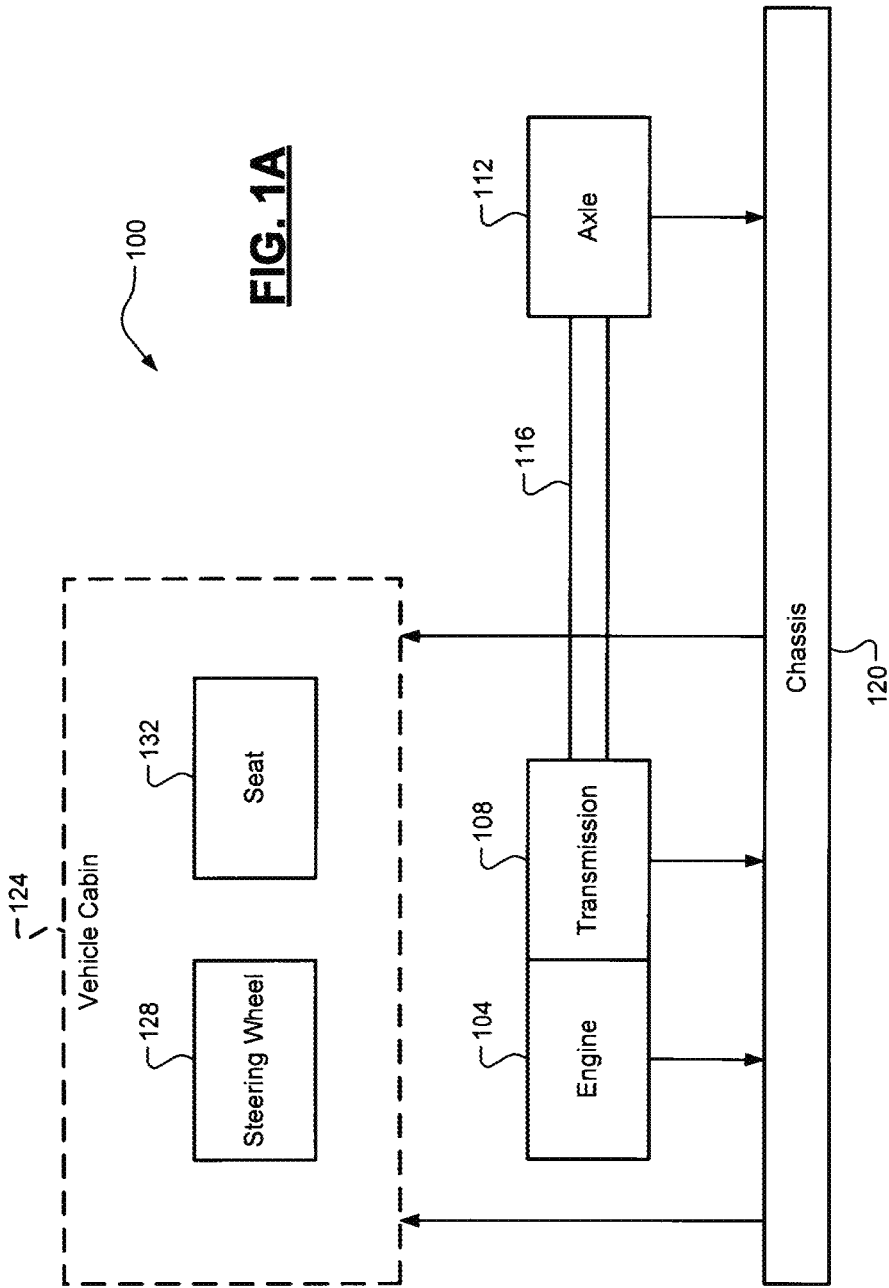

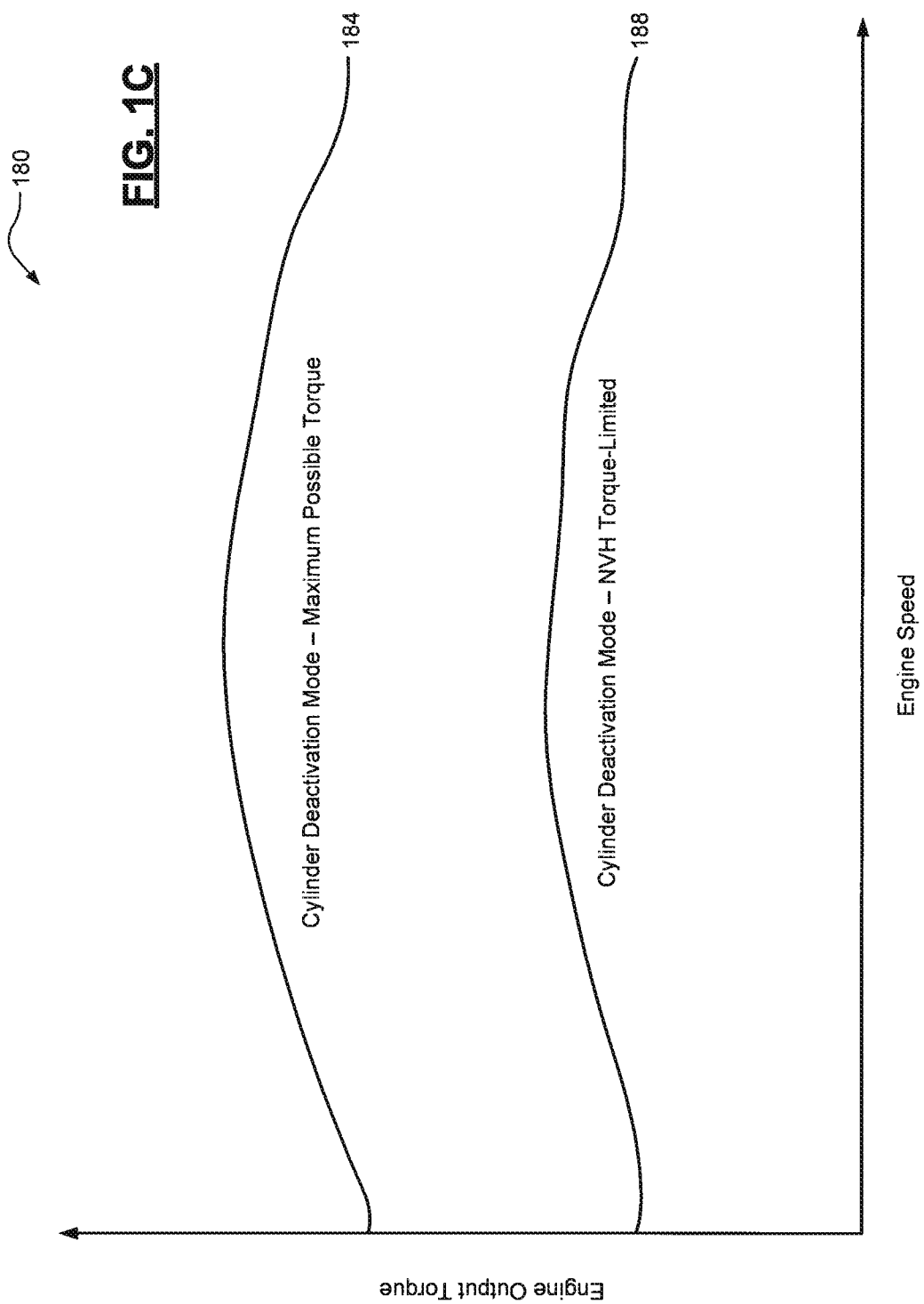

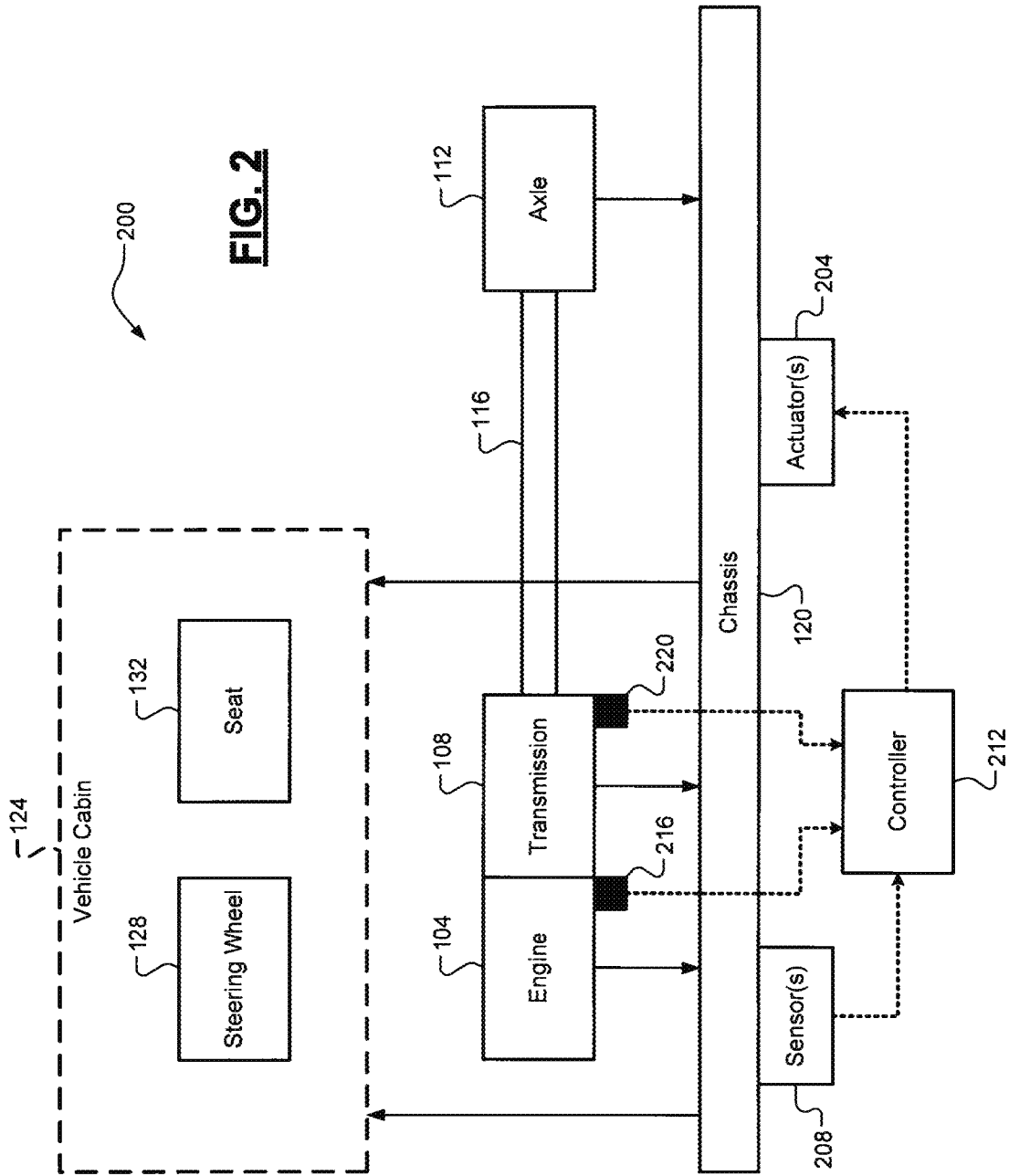

US 11,001,268 B2

ACTIVE VEHICLE CHASSIS DAMPENING SYSTEMS AND METHODS

FIELD

The present application generally relates to a vehicle chassis and, more particularly, to systems and methods for active vehicle chassis dampening.

BACKGROUND

Some vehicle chassis, such as pickup trucks and unibody sport utility vehicles (SUVs) having isolated cradles, include a pair of longitudinal frame rails. Vibrations caused by an engine and/or a transmission of the vehicle propagate through the frame rails and into a cabin of the vehicle. These vibrations could potentially be felt by a driver at specific touch points, such their seat and the steering wheel. Conventional chassis dampening systems are passive and thus are not adjustable to compensate for different vibrational frequencies. One example of a passive dampening system is a passive rubber dampener that is designed for dampening a worst-case vibrational frequency. These passive rubber dampeners are also very heavy (~10 pounds per frame rail). Accordingly, while such chassis dampening systems work well for their intended purpose, there remains a need for improvement in the relevant art.

SUMMARY

According to one example aspect of the invention, an active dampening system for a chassis of a vehicle is presented. In one exemplary implementation, the system comprises: a set of actuators comprising at least one actuator arranged on or proximate to each of first and second frame rails of the chassis, each actuator being configured to generate a vibrational force in at least one direction, a set of sensors comprising at least one sensor arranged on or proximate to each of the first and second frame rails and configured to measure vibration of the first and second frame rails, and a controller. The controller is configured to operate the engine in a cylinder deactivation mode during which at least some of a plurality of cylinders of the engine are deactivated and, during the cylinder deactivation mode: receive, from the set of sensors, the measured vibrations of the first and second frame rails, generate control signals for the set of actuators based on the measured vibration of the first and second frame rails, respectively, and output, to the set of actuators, the control signals, wherein receipt of the control signals cause the set of actuators to generate vibrational forces that dampen the vibration of the first and second frame rails, respectively, to decrease noise/vibration/harshness (NVH) such that an operational range of the cylinder deactivation mode can be extended to thereby increase a fuel economy of the vehicle.

In some implementations, the set of actuators comprises first and second linear force generators associated with the first and second frame rails, respectively, the first and second linear force generators each configured to generate vibrational force in two opposing directions. In some implementations, the set of sensors comprises first and second accelerometers associated with the first and second frame rails, respectively, wherein the first and second linear force generators are arranged at first and second angles with respect to a vertical direction. In some implementations, the first and second angles are each zero degrees. In some implementations, the first and second angles are each not zero degrees, and wherein the controller is configured to generate the control signals such that the first and second linear force generators at least partially dampen both lateral and vertical vibrations at the first and second frame rails.

In some implementations, the system further comprises first and second mounting members attached to the first and second frame rails, respectively, and configured to receive the first and second linear force generators, respectively, wherein the first and second mounting members are each further configured to be adjusted between N different angles with respect to the vertical direction to select the first and second angles, wherein N is an integer greater than one. In some implementations, N is five.

In some implementations, the first and second sets of actuators each comprise first and second circular or orbital force generators each configured to generate vibrational force in any desired direction. In some implementations, the set of sensors comprises first and second pairs of accelerometers associated with the first and second frame rails, respectively, wherein the first and second pairs of accelerometers each include a laterally-oriented accelerometer and a vertically-oriented accelerometer. In some implementations, the controller is configured to generate the control signals such that the first and second circular or orbital force generators dampen lateral, vertical, and torsional vibrations at the first and second frame rails.

According to another example aspect of the invention, a method of calibrating and controlling an active dampening system for a chassis of a vehicle having an engine is presented. In one exemplary implementation, the method comprises: operating, by a controller, the engine in a cylinder deactivation mode during which at least some of a plurality of cylinders of the engine are deactivated and, during the cylinder deactivation mode, and during the cylinder deactivation mode: receiving, by the controller and from a set of sensors, measured vibrations on first and second frame rails of the chassis, the set of sensors comprising at least one sensor arranged on or proximate to each of the first and second frame rails, generating, by the controller, control signals for a set of actuators based on the measured vibration of the first and second frame rails, respectively, the set of actuators comprising at least one actuator arranged on or proximate to each of the first and second frame rails, each actuator being configured to generate a vibrational force in at least one direction, and outputting, by the controller and to the set of actuators, the control signals, wherein receipt of the control signals cause the set of actuators to generate vibrational forces that dampen the vibration of the first and second frame rails, respectively, to decrease NVH such that an operational range of the cylinder deactivation mode can be extended to thereby increase a fuel economy of the vehicle.

In some implementations, the set of actuators comprises first and second linear force generators associated with the first and second frame rails, respectively, the first and second linear force generators each configured to generate vibrational force in two opposing directions. In some implementations, the set of sensors comprises first and second accelerometers associated with the first and second frame rails, respectively, wherein the first and second linear force generators are arranged at first and second angles with respect to a vertical direction. In some implementations, the first and second angles are each zero degrees. In some implementations, the first and second angles are each not zero degrees, and wherein the controller is configured to generate the control signals such that the first and second linear force generators at least partially dampen both lateral and vertical vibrations at the first and second frame rails.

In some implementations, the vehicle further comprises first and second mounting members attached to the first and second frame rails, respectively, and configured to receive the first and second linear force generators, respectively, wherein the first and second mounting members are each further configured to be adjusted between N different angles with respect to the vertical direction to select the first and second angles, wherein N is an integer greater than one. In some implementations, N is five.

In some implementations, the first and second sets of actuators each comprise first and second circular or orbital force generators each configured to generate vibrational force in any desired direction. In some implementations, the set of sensors comprises first and second pairs of accelerometers associated with the first and second frame rails, respectively, wherein the first and second pairs of accelerometers each include a laterally-oriented accelerometer and a vertically-oriented accelerometer. In some implementations, the controller is configured to generate the control signals such that the first and second circular or orbital force generators dampen lateral, vertical, and torsional vibrations at the first and second frame rails.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1A is a diagram of an example vehicle according to the principles of the present disclosure;

FIG. 1C is a plot of a noise/vibration/harshness (NVH) limited operating range of a cylinder deactivation mode of an example engine of the vehicle of FIG. 1A according to the principles of the present disclosure;

FIG. 2 is a diagram of one embodiment of an example active chassis dampening system for the vehicle of FIG. 1A according to the principles of the present disclosure;

DETAILED DESCRIPTION

Figure 1B:
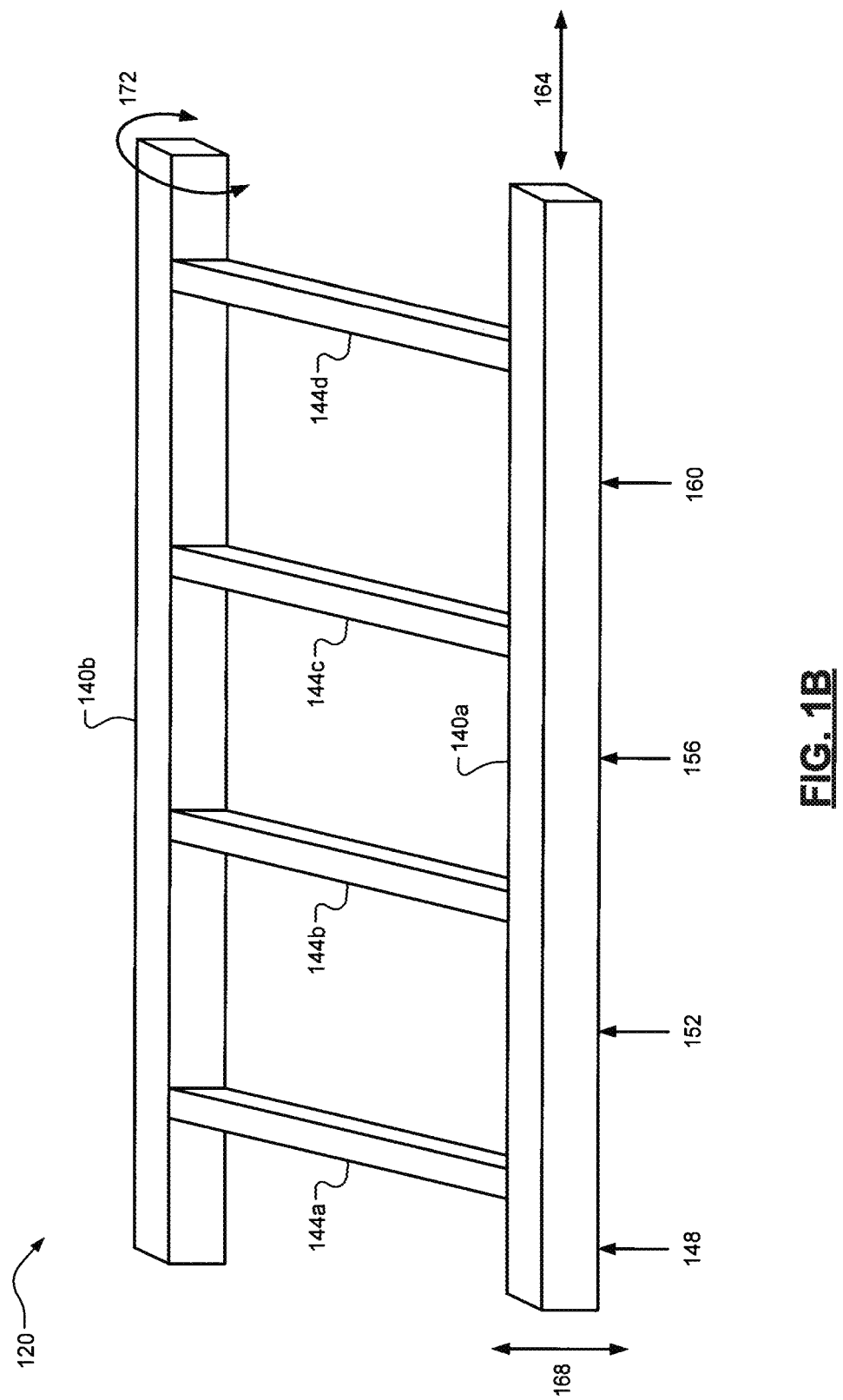
FIG. 1B is a diagram of an example chassis of the vehicle of FIG. 1A according to the principles of the present disclosure.

As discussed above, passive dampening systems (e.g., rubber dampeners) for a vehicle chassis are heavy and are unable to effectively dampen vibrations across a large range of vibrational frequencies. FIG. 1A illustrates an example vehicle 100 comprising an engine 104 and a transmission 108 that generate and transfer torque to one or more axles 112 via shafts and other components 116 (e.g., a differential). Vibrations at the engine 104 (e.g., due to misfires or poor combustion), the transmission 108, and/or the axle(s) 112 propagate to a chassis 120 of the vehicle 100. These vibrations are also able to propagate from the chassis 120 to the a cabin 124 of the vehicle 100, where they are potentially noticeable at touch points of a driver, such as the steering wheel 128 and a seat 132 (e.g., a seat track).

FIG. 1B, the chassis 120 comprises first and second frame rails 140a, 140b. There are also cross-members or supports 144a, 144b, 144c, 144d arranged at various locations along a length of the chassis 120. In one exemplary implementation, location 148 corresponds to a front end module (FEM) mount location, location 152 corresponds to an A-pillar mount location, location 156 corresponds to a B-pillar mount location, and location 160 corresponds to a C-pillar mount location. In addition to different vibrational force magnitudes and frequencies, there are also different types of vibrational forces. These include, for example, (i) lateral or longitudinal vibrations (see arrows 164), (ii) vertical vibrations (see arrows 168), and (iii) rotational, twisting, or torsional vibrations (see arrows 172) that are a combination of lateral and vertical vibrational forces.

Accordingly, active vehicle chassis dampening systems and methods are presented. These active chassis dampening systems and methods are configured to actively dampen or cancel out vibrations of frame rails of a vehicle chassis. One benefit of these systems and methods is decreased noise/vibration/harshness (NVH), thereby making the driver more comfortable while driving the vehicle. Additionally, these systems and methods enable the extended use of a cylinder deactivation mode of an engine over a larger range of operating conditions. As shown in plot 180 of FIG. 1C, an engine operating in a cylinder deactivation mode (e.g., four cylinders, or V4, instead of 8 cylinders, for a V8 engine), represented by line 184, is able to meet the driver's torque demands across a larger range of operating conditions, but this range is often limited in order to meet NVH requirements, represented by line 188. By actively dampening the vibrational disturbance of the chassis frame rails, the engine could operate in the cylinder deactivation mode over a wider range of operating conditions, thereby increasing fuel economy.

Referring now to FIG. 2, a diagram of an example active chassis dampening system 200 is illustrated. As shown, the system 200 comprises one or more sets of actuators 204 and one or more sets of sensors 208 that interact with the chassis 120 of the vehicle 100. Each actuator 204 is a force generator that is configured to generate a vibrational force in at least one direction or along at least one axis. In one exemplary implementation, each actuator 204 comprises a rare earth magnet and an electronic field generator (e.g., a copper winding) that varies an electrical field around the magnet to alter the momentum of the magnet and vary the vibrational force applied to the chassis 120. Each sensor 208 is configured to measure vibration of the chassis 120 also in at least one direction or along at least one axis. One non-limiting example of the sensor(s) 208 are accelerometers. A controller 212 receives measurements from the sensor(s) 208 indicative of vibration of the chassis 120 and in turn generates control signals for the actuator(s) 204 such that the actuator(s) 204 generate canceling vibrational forces at the chassis 120. The controller 212 could also proactively monitor other parameters, such as a crankshaft position or engine speed sensor 216 and/or a transmission output shaft or vehicle speed sensor 220 to anticipate when vibration is to be expected at the chassis 120.

Figure 3A:
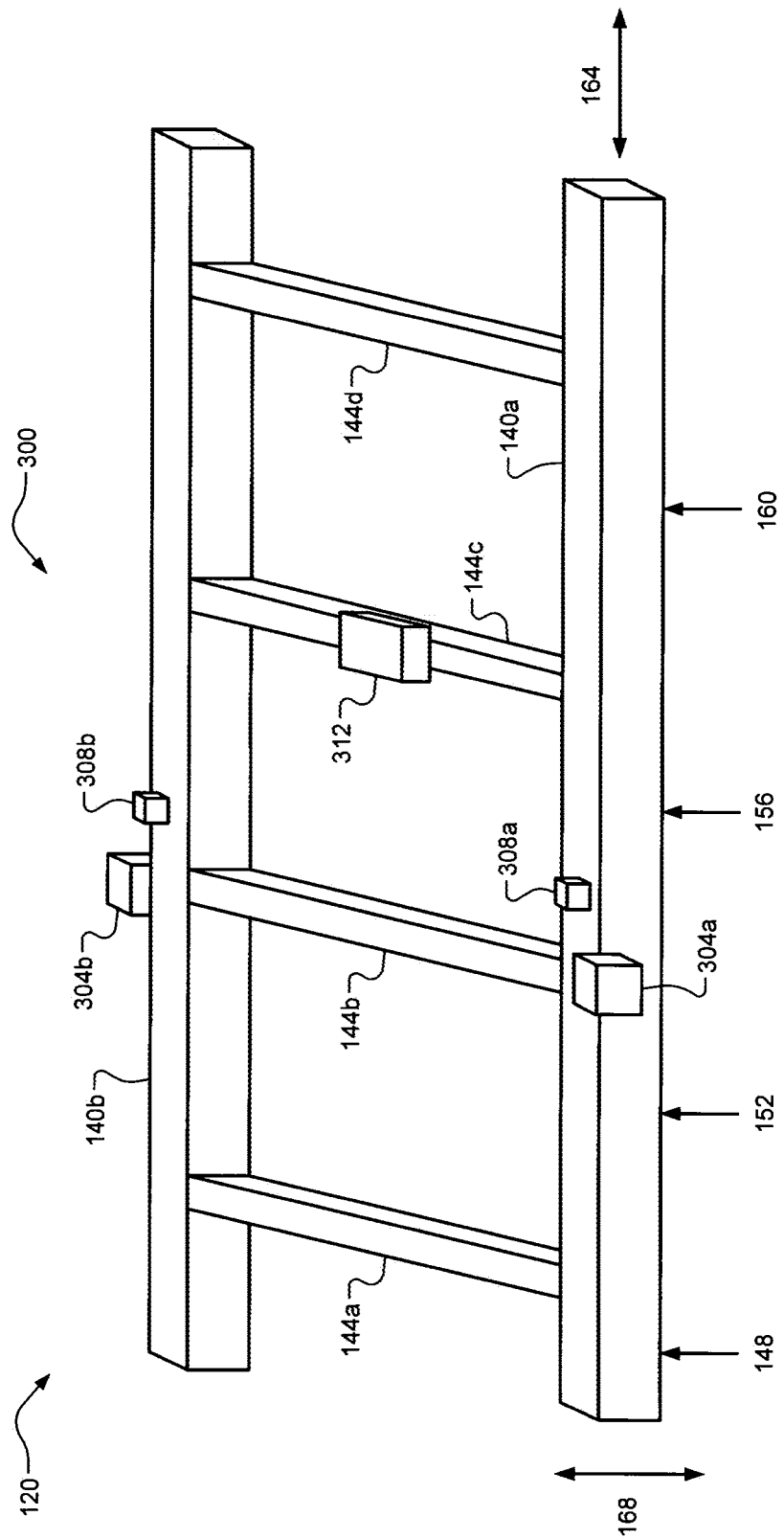
FIG. 3A is a diagram of a first example embodiment of the active chassis dampening system of FIG. 2 according to the principles of the present disclosure.

Referring now to FIG. 3A, a first embodiment 300 ("system 300") for the active chassis dampening system 200 is illustrated. The system 300 comprises a first set of one or more actuators 304a disposed on or proximate to the first frame rail 140a and a second set of one or more actuators 304b disposed on or proximate to the second frame rail 140b. In one exemplary implementation, each of the actuators 304a, 304b is a lateral force generator or shaker configured to generate a vibrational force in first/second opposing directions (see arrows 164). The system 300 further comprises a first set of one or more sensors 308a disposed on or proximate to the first frame rail 140a and a second set of one or more sensors 308b disposed on or proximate to the second frame rail 140b. In one exemplary implementation, each of the sensors 308a, 308b is an accelerometer configured to measure vibrational force along a specific axis (e.g., arrows 164). While a single pair of actuators 304a, 304b and a single pair of sensors 308a, 308b are shown, it will be appreciated that additional actuators and/or sensors could be implemented.

Figure 3B:
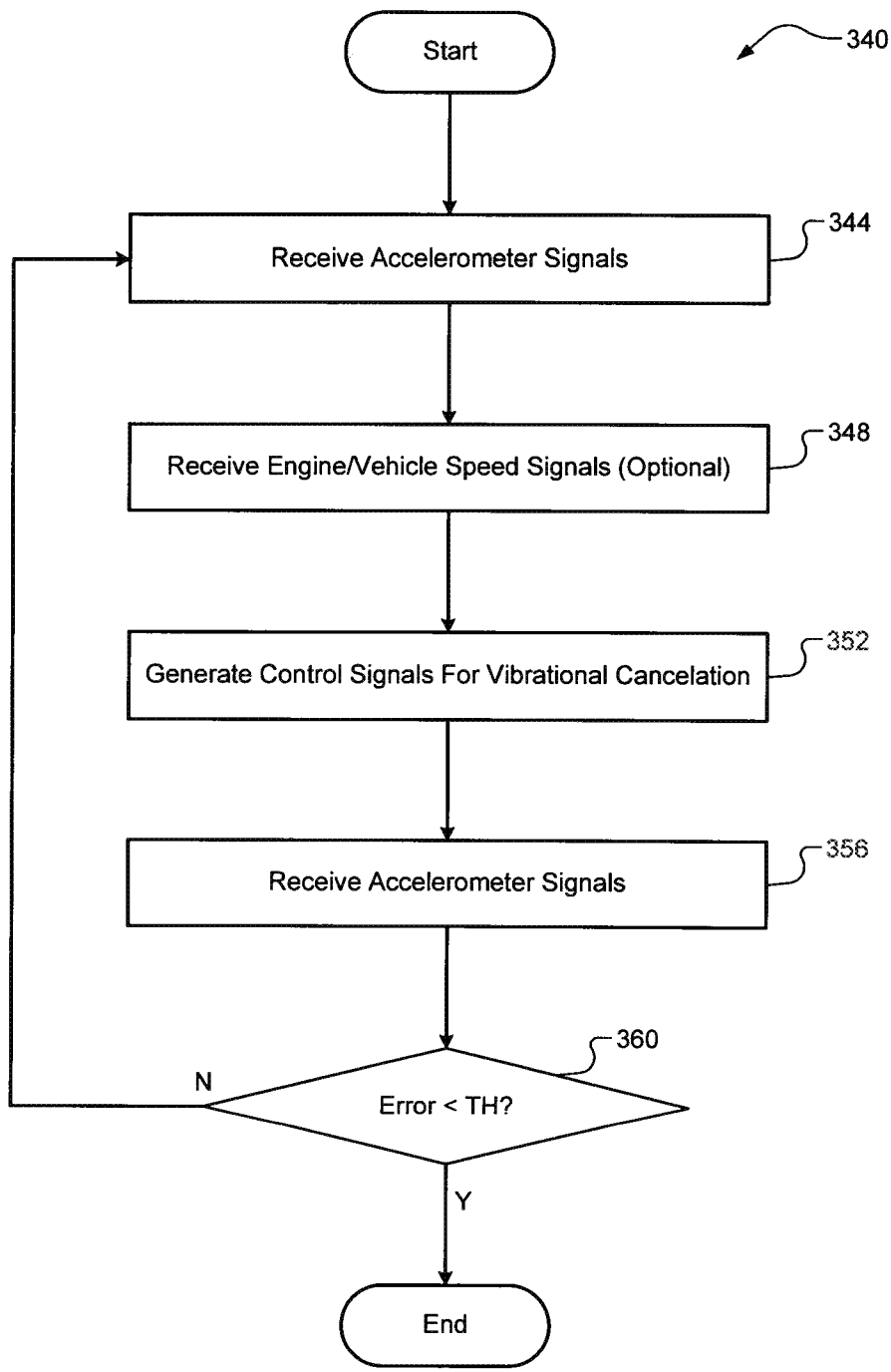
FIG. 3B is a flow diagram of an example method of controlling the first embodiment of the active chassis dampening system of FIG. 3A according to the principles of the present disclosure.

Referring now to FIG. 3B and with continued reference to FIG. 3A, a controller 312 (e.g., an engine control unit, or ECU) is mounted proximate to the chassis 120 (e.g., proximate to cross-member 144c) and is configured to perform a method 340 of controlling the system 300. At 344, the controller 312 receives the signals from sensors 308a, 308b. At 348, the controller 312 optionally receives signals from other sensors, such as the engine speed sensor 216 and the vehicle speed sensor 220 (see FIG. 2). At 352, the controller 312 generates control signals for the actuators 304a, 304b such that the actuators 304a, 304b generate canceling vibrational forces at the frame rails 140a, 140b. At 356, the controller 312 again receives the signals from sensors 308a, 308b. At 360, the controller 312 determines whether a difference between these newly-received signals from sensors 308a, 308b and an expected value (e.g., zero) is less than a desired threshold (TH). When false, the method 340 returns to 344 and the process repeats until the vibrational disturbance at the chassis 120 is brought below a desired level. When true, the method 340 ends or returns to 344 and continues operating while the vehicle 100 is operating.

Figure 3C:
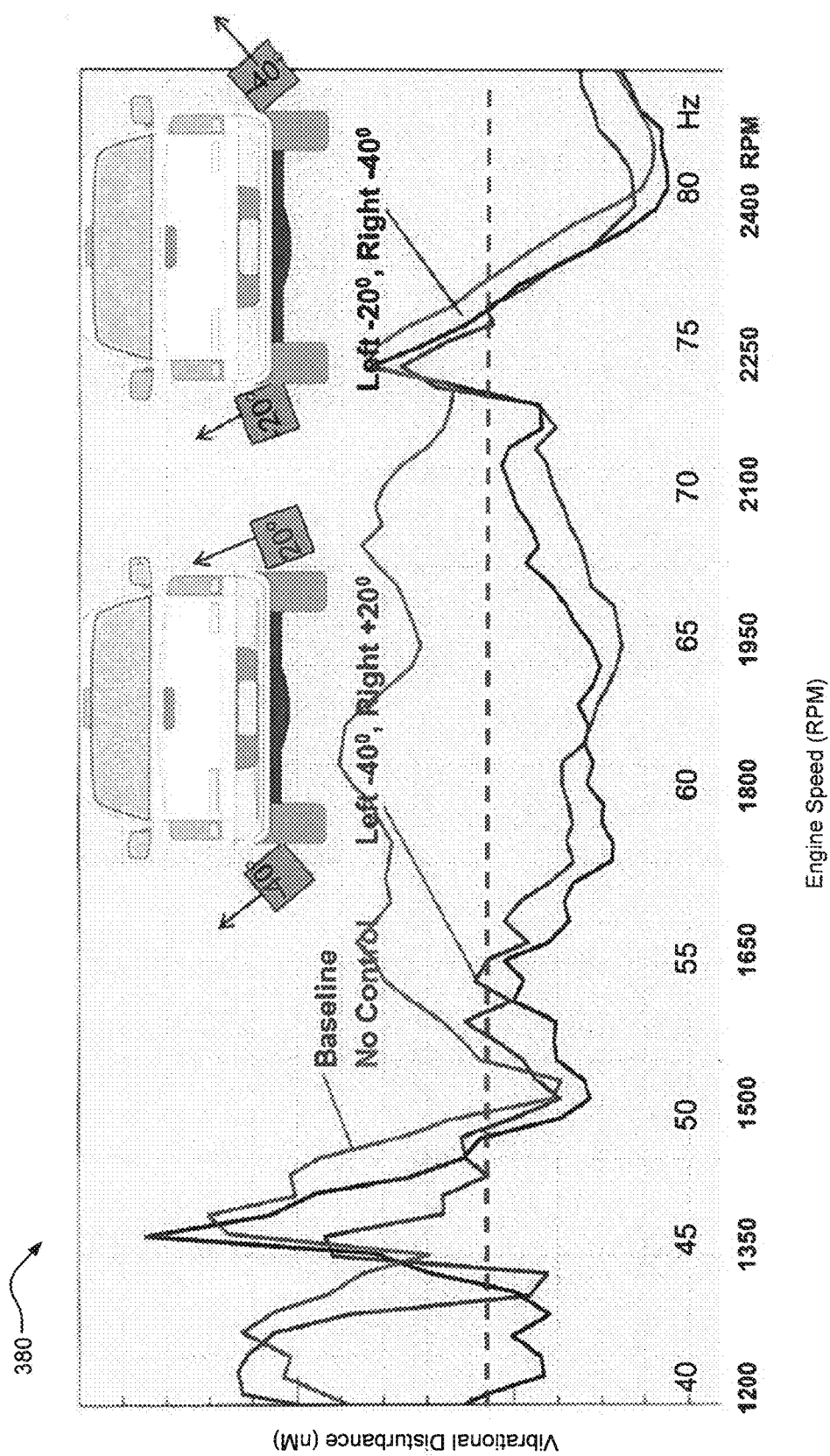
FIG. 3C is plots of example performance of the first embodiment of the active chassis dampening system of FIG. 3A according to the principles of the present disclosure.

While the system 300 works well for its intended purpose and performs better than conventional passive dampening systems, the system 300 could suffer from poor performance with respect to other vibrational disturbances, such as vertical vibrational disturbances. The system 300 may also weigh significantly less than conventional passive dampening systems (e.g., ~5 pounds per frame rail versus ~10 pounds per frame rail). FIG. 3C illustrates a plot 380 of performance of the system 300 (vibrational disturbance, e.g., at the seat 132) with the actuators 304a, 308b aligned vertically (zero degree, or 0° orientation with respect to vertical) as well at different offsets (−40°, +20° and −20°, −40° for the first and second actuators 304a, 304b, respectively). Note that these views are from a rear of the vehicle 100. As shown, both of the angled orientations perform better than the baseline or 0° orientation for engine speeds from about 1600 revolutions per minute (RPM) to about 2200 RPM. While the −40° orientation for actuator 304b responds well around the 1200 RPM (40 hertz, or Hz) peak, it degrades around the 1350 RPM (45 Hz) peak. On the other hand, while the +20° orientation responds well around the 1350 RPM (45 Hz) peak, it degrades around the 1200 RPM (40 Hz) peak.

Figure 4A:
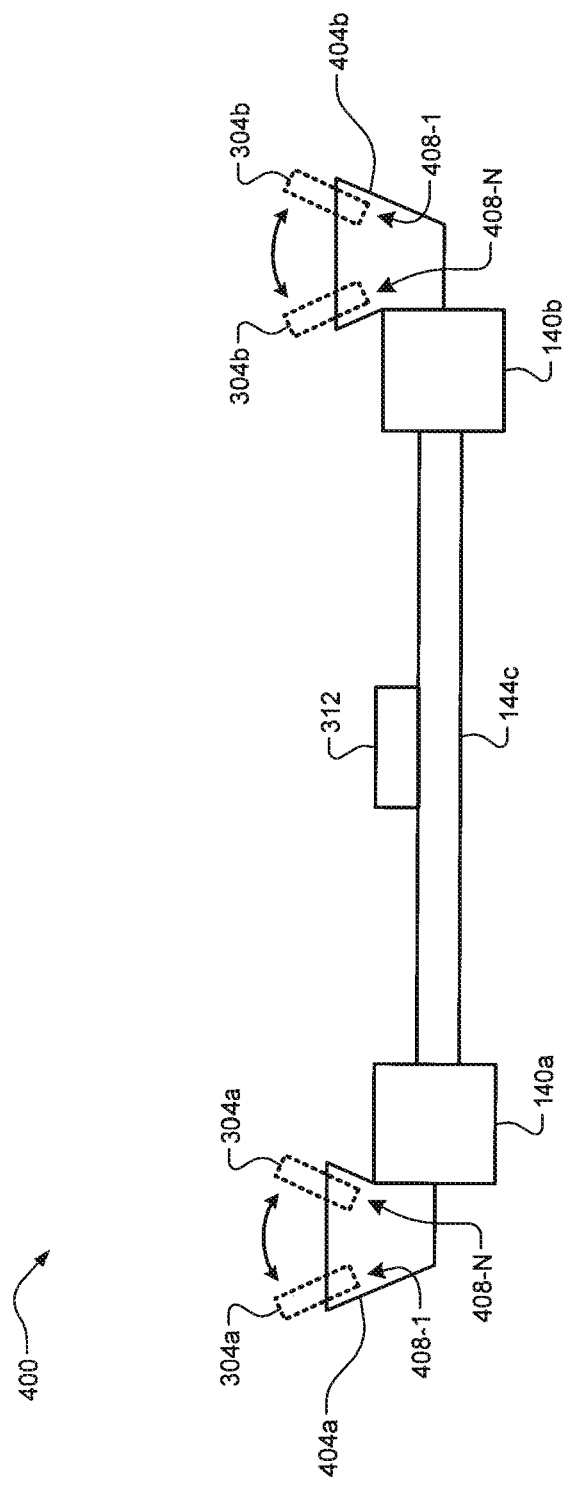
FIG. 4A is a diagram of a second embodiment of the active chassis dampening system of FIG. 2 according to the principles of the present disclosure.

Thus, depending on the particular vehicle configuration, different angled orientations could be desired. For a pickup truck, for example, there could be over 100 different possible configurations due to various options (extended cab, crew cab, 2 door, 4 door, etc.). Manually configuring the angled orientation of the actuators 304a, 304b for each vehicle 100 is challenging and time consuming. Accordingly, an adjustable damper bracket is disclosed herein that receives the actuators 304a, 304b and is configured to adjust the angled orientation of each actuator 304a, 304b between a plurality of different predetermined angles (an integer value N>1). In one exemplary implementation, N equals five. FIG. 4A illustrates a second embodiment 400 ("system 400") for the active chassis dampening system 200 is illustrated. This view is from the rear of the vehicle 100, similar to FIG. 3C. As shown, first and second sets of adjustable damper brackets 404a, 404b are disposed on or proximate to the frame rails 144a, 144b and are configured to receive the actuators 304a, 304b. During vehicle chassis assembly or calibration, each of these adjustable damper brackets 404a, 404b is set to one of the plurality of angled orientations for the particular configuration of the vehicle 100.

Figure 4B:
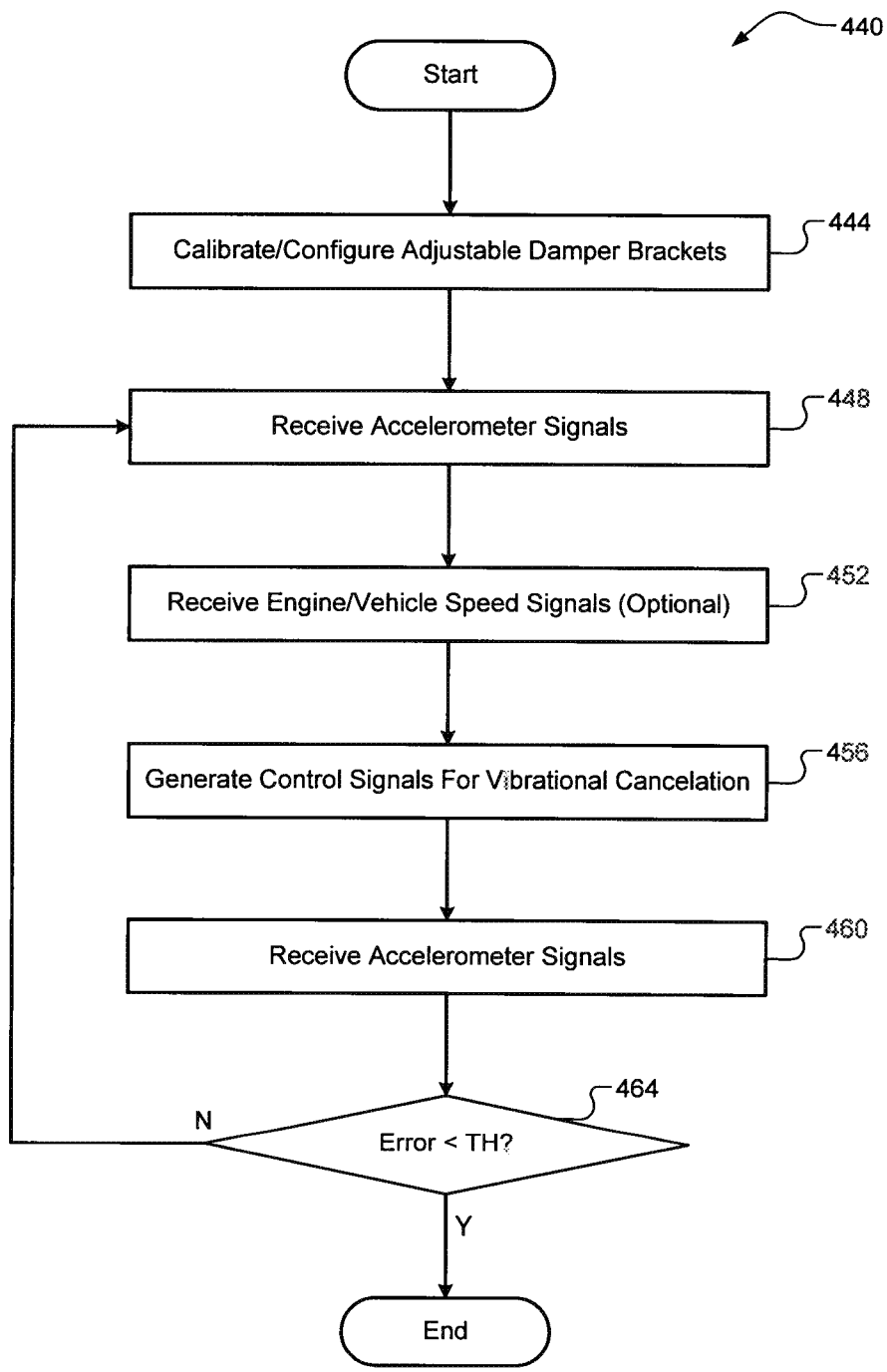
FIG. 4B is flow diagram of an example method of calibrating and controlling the second embodiment of the active chassis dampening system of FIG. 4A according to the principles of the present disclosure.
Figure 4C:
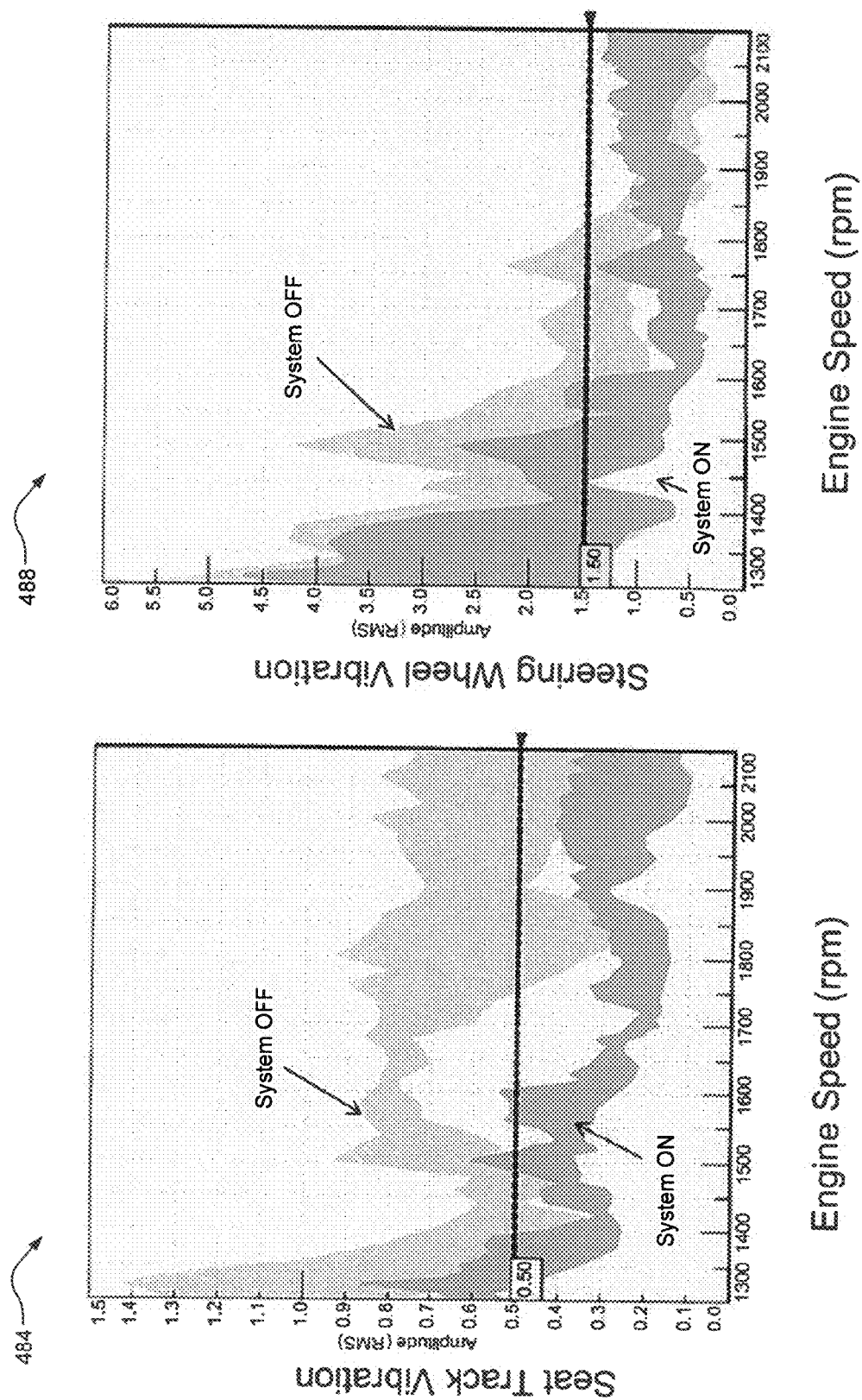
FIG. 4C is plots of example performance of the second embodiment of the active chassis dampening system of FIG. 4A according to the principles of the present disclosure.

Referring now to FIG. 4B and with continued reference to FIGS. 3A and 4A, a method 440 of calibrating/configuring and controlling the system 400 is illustrated. The method 440 includes an initial calibration or configuration step 444 during which a human operator or a machine adjusts each of the adjustable damper brackets 404a, 404b to one of the plurality of predetermined angled orientations. Each of the selected angled orientations is predetermined for the specific configuration of the vehicle 100. The remaining control steps 448 to 464 correspond to steps 344 to 360 of FIG. 3B. In other words, the actual control of system 400 remains the same as system 300, with the exception of the additional calibration step for the adjustable damper brackets 404a, 404b. FIG. 4C illustrates scatterband plots 480, 484 of three different example vehicle types with maximum cylinder deactivation mode (e.g., V4 mode) torque excitation and the system 400 both applied (ON) and not applied (OFF). As shown, both seat vibration and steering wheel vibration are drastically reduced to better than desired NVH levels when the system 400 is applied compared to when the system 400 is not applied. While this system 400 works well for its intended purpose and potentially performs better than conventional passive dampening systems and the non-angle-adjustable system 300, the system 400 still suffers from the need to manually calibrate each adjustable damper bracket 404a, 404b during vehicle build. In addition, the system 400 is not fully adjustable such that it is able to dampen all types of vibrational disturbances in any desired direction.

Figure 5A:
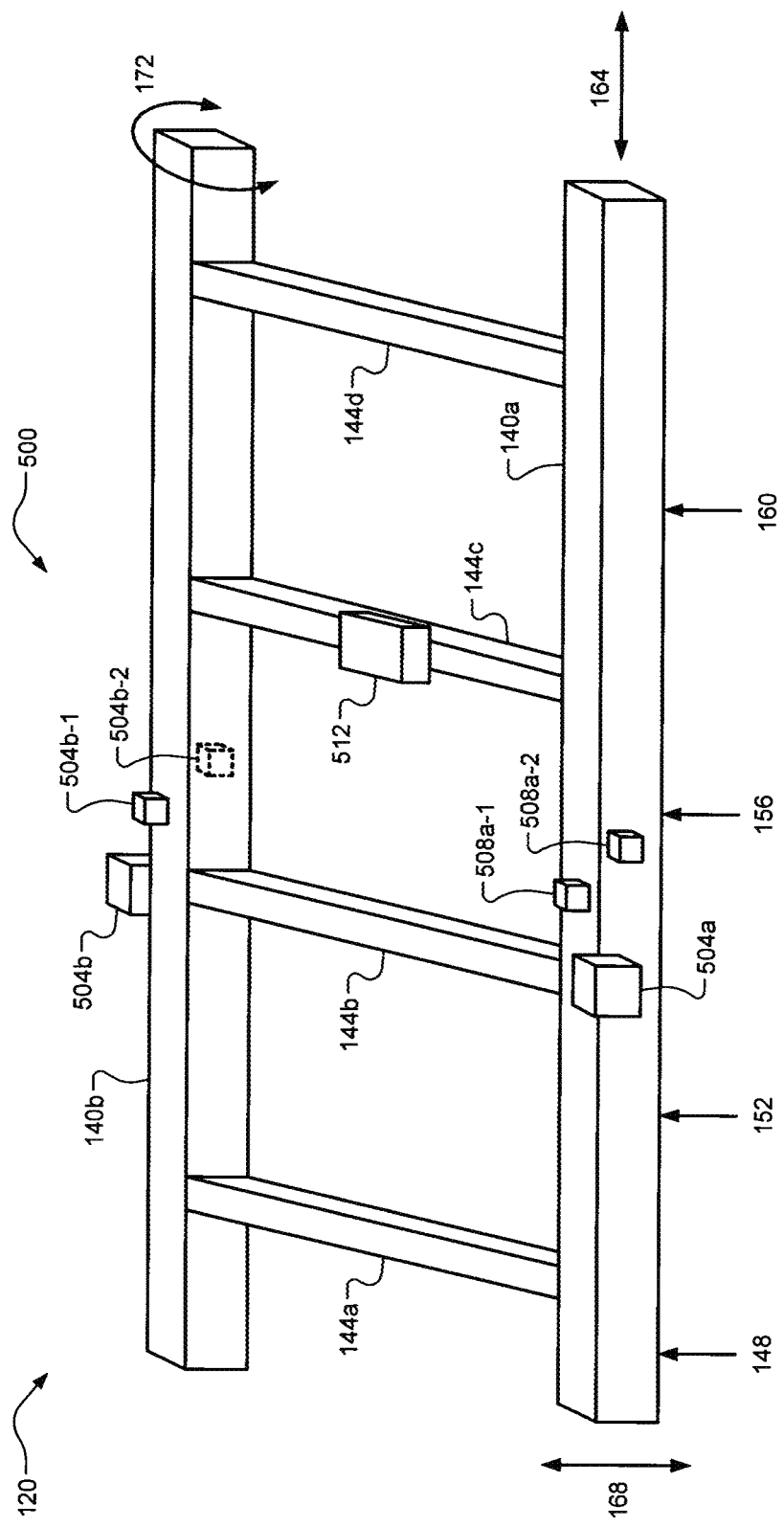
FIG. 5A is a diagram of a third embodiment of the active chassis dampening system of FIG. 2 according to the principles of the present disclosure.

Referring now to FIG. 5A, a third embodiment 500 ("system 500") of the active chassis dampening system 200 is illustrated. This system 500 potentially performs better than conventional passive dampening systems and the other systems 300, 400 described herein and also potentially (i) weighs significantly less (e.g., ~2-3 pounds per frame rail compared to ~5 or ~10 pounds per frame rail) and (ii) requires less power (e.g., ~50%) compared to systems 300, 400 due to lower-power actuators. The system 500 comprises first and second sets of circular or orbital force generators 504a, 504b disposed on or proximate to the first and second frame rails 140a, 140b. These circular or orbital force generators 504a, 504b are configured to generate a vibrational force in any desired direction and thus are not limited to a specific orientation with respect to the lateral and vertical directions 164, 168 as systems 300 and 400 are. In one exemplary implementation, each circular or orbital force generator 504a, 504b comprises a pair of motors each having a stator and a rotor that rotates about a central shaft, with a rotating mass eccentrically connected to each rotor such that rotation of the rotor causes a circular or orbital force. Non-limiting examples of the circular or orbiting force generators 504a, 504 include (i) a single orbiting offset mass, (ii) dual co-rotating masses with varying relative phase angles, (iii) dual counter-rotating masses with varying relative phase angles, (iv) two sets of counter-rotating masses with varying phase angles located close to one another, and (v) combinations thereof. It will be appreciated that a certain type or combinations of these configurations could be chosen as having optimal performance for each different vehicle chassis configuration.

Figure 5B:
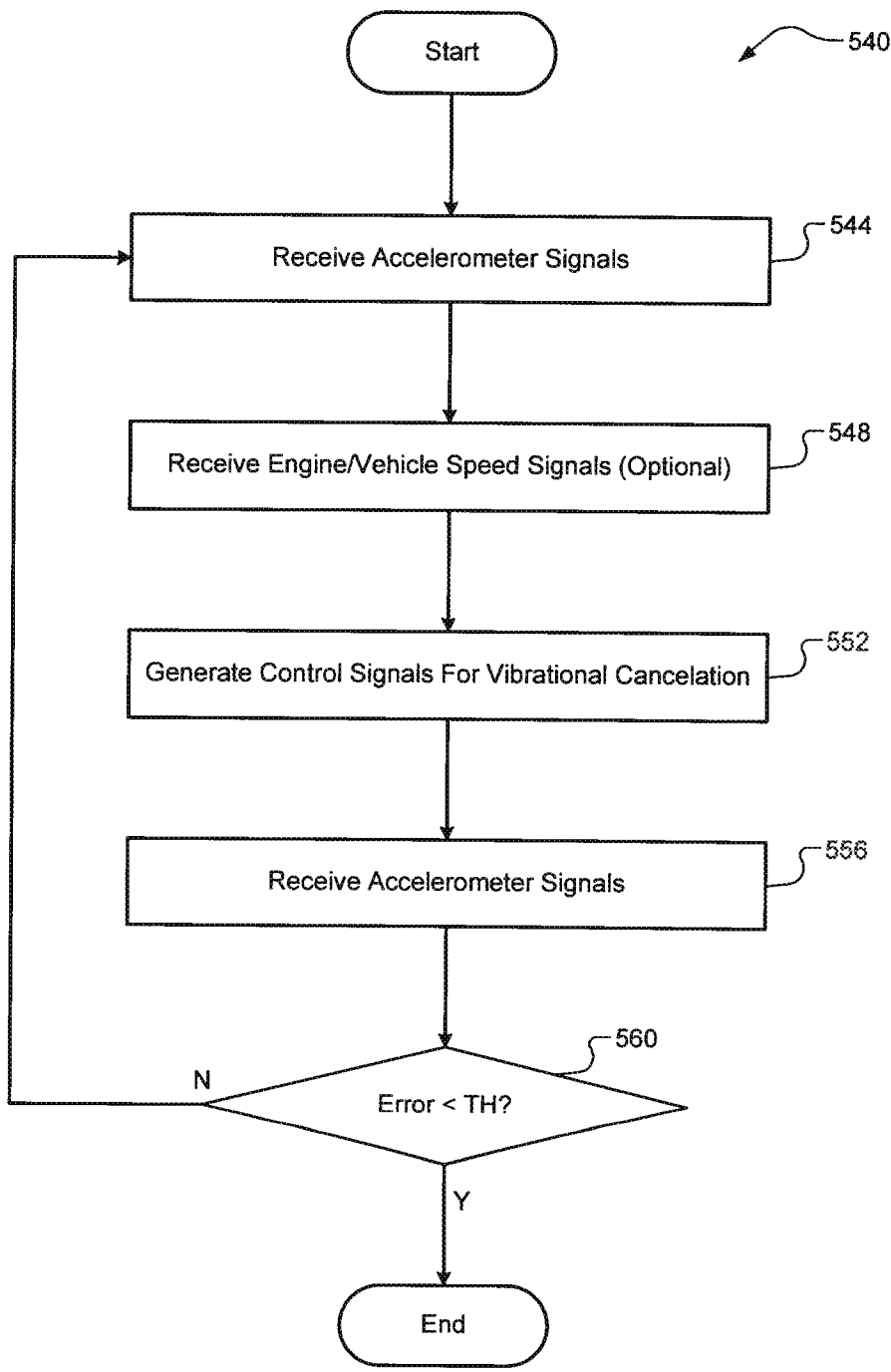
FIG. 5B is a flow diagram of an example method of controlling the third embodiment of the active chassis dampening system of FIG. 5A according to the principles of the present disclosure.

First and second sets of pairs of sensors 508a-1, 508a-2 and 508b-1, 508b-2, such as accelerometers, (collectively "sensors 508") are arranged on or proximate to the first and second frame rails 140a, 140b. One sensor of each sensor pair is configured to measure lateral vibrational disturbance while the other is configured to measure vertical vibrational disturbance. This is different than systems 300, 400, which measured vibrational disturbance only in a single direction or along a single axis. While a single pair of sensors 508a-1, 508a-2 and 508b-1, 508b-2 are shown for each frame rail 140a, 140b, it will again be appreciated that each frame rail 140a, 140b could have additional actuators and/or sensors associated therewith. Based on these measured vibrational disturbances, a controller 512 (having additional input channels due to the additional sensors 508) is configured to utilize the received measurements/signals to generate control signals for the actuators 504a, 504b to cancel the vibrational disturbances at the chassis 120. FIG. 5B illustrates a flow diagram of a method 540 for controlling the system 500. This method 540 is similar to method 340 of FIG. 3B, except there are additional sensor measurements received at step 544. Because this system 500 is able to generate vibrational force in any desired direction, the system 500 is able to achieve improved vibrational dampening while also eliminating the need for adjustable damper brackets 404a, 404b for actuators (e.g., lateral force generators) 304a, 304a.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An active dampening system for a chassis of a vehicle having an engine, the system comprising:
   first and second linear force generators each being configured to generate vibrational force in two opposing directions;
   first and second adjustable damper brackets attached to first and second frame rails of the chassis, respectively, and configured to receive the first and second linear force generators, respectively, wherein the first and second adjustable damper brackets are each further configured to be rotatably adjusted between N different non-zero degree angles with respect to a vertical direction to select first and second angles for the first and second linear force generators, respectively, during a non-operational state of the vehicle and without adjusting an orientation of the chassis, wherein N is an integer greater than one;
   first and second accelerometers arranged on or proximate to the first and second frame rails, respectively, and configured to measure vibration of the first and second frame rails, respectively; and
   a controller configured to operate the engine in a cylinder deactivation mode during which at least some of a plurality of cylinders of the engine are deactivated and, during the cylinder deactivation mode:
   receive, from the first and second accelerometers, the measured vibrations of the first and second frame rails;
   generate control signals for the first and second linear force generators based on the measured vibration of the first and second frame rails, respectively; and
   output, to the first and second linear force generators, the control signals, wherein receipt of the control signals cause the first and second linear force generators to generate vibrational forces that at least partially dampen both lateral and vertical vibrations at the first and second frame rails, respectively, to decrease noise/vibration/harshness (NVH) such that an operational range of the cylinder deactivation mode can be extended to thereby increase a fuel economy of the vehicle.

2. The system of claim 1, wherein N is five, and wherein the non-operational state of the vehicle is one of a vehicle build, a vehicle service, and a vehicle calibration event.

3. The system of claim 1, wherein the first and second adjustable damper brackets are rotatably adjustable by a human operator.

4. The system of claim 1, wherein the first and second adjustable damper brackets are rotatably adjustable by a machine.

5. A method of calibrating and controlling an active dampening system for a chassis of a vehicle having an engine, the method comprising:

rotatably adjusting each of first and second adjustable damper brackets between one of N different non-zero degree angles with respect to a vertical direction during a non-operational state of the vehicle and without adjusting an orientation of the chasses, wherein the first and second adjustable damper brackets are attached to first and second frame rails of the chassis, respectively, and are configured to receive first and second linear force generators, respectively, and wherein N is an integer greater than one;

after the adjusting, operating, by a controller, the engine in a cylinder deactivation mode during which at least some of a plurality of cylinders of the engine are deactivated and, during the cylinder deactivation mode; and during the cylinder deactivation mode:
  receiving, by the controller and from a first and second accelerometers, measured vibrations of the first and second frame rails, the first and second accelerometers being arranged on or proximate to the first and second frame rails, respectively;
  generating, by the controller, control signals for the first and second linear force generators based on the measured vibration of the first and second frame rails, respectively, the first and second linear force generators each being configured to generate vibrational force in two opposing directions; and
  outputting, by the controller and to the first and second linear force generators, the control signals, wherein receipt of the control signals cause the first and second linear force generators to generate vibrational forces that at least partially dampen both lateral and vertical vibrations at the first and second frame rails, respectively, to decrease noise/vibration/harshness (NVH) such that an operational range of the cylinder deactivation mode can be extended to thereby increase a fuel economy of the vehicle.

6. The method of claim 5, wherein N is five, and wherein the non-operational state of the vehicle is one of a vehicle build, a vehicle service, and a vehicle calibration event.

7. The method of claim 5, wherein the rotatable adjusting of the first and second adjustable damper brackets is performed by a human operator.

8. The method of claim 5, wherein the rotatable adjusting of the first and second rotatable damper brackets is performed by a machine.

* * * * *